(12) United States Patent
Liu et al.

(10) Patent No.: US 6,540,843 B1
(45) Date of Patent: Apr. 1, 2003

(54) METHOD OF PREPARING A CATALYST LAYER OVER A METALLIC SURFACE OF A RECUPERATOR

(75) Inventors: Di-Jia Liu, Naperville, IL (US); Daniel R. Winstead, Schaumburg, IL (US); Norman Van Den Bussche, Arlington Heights, IL (US)

(73) Assignee: Honeywell International Inc., Morristown, NJ (US)

( * ) Notice: Subject to any disclaimer, the term of this patent is extended or adjusted under 35 U.S.C. 154(b) by 50 days.

(21) Appl. No.: 09/693,662

(22) Filed: Oct. 20, 2000

Related U.S. Application Data

(63) Continuation-in-part of application No. 09/659,629, filed on Sep. 12, 2000.

(51) Int. Cl.$^7$ .............................................. C23C 22/00
(52) U.S. Cl. ...................... 148/243; 148/272; 148/277; 148/284; 427/383.7
(58) Field of Search ................................ 148/243, 272, 148/277, 284, 285, 286, 287; 427/383.7

(56) References Cited

U.S. PATENT DOCUMENTS

| 4,196,099 A | 4/1980 | Hunter et al. |
| 4,279,782 A | 7/1981 | Chapman et al. |
| 4,318,828 A | 3/1982 | Chapman |
| 4,331,631 A | 5/1982 | Chapman et al. |
| 4,601,999 A | 7/1986 | Retallick et al. |
| 5,202,303 A | 4/1993 | Retallick et al. |
| 5,208,206 A | 5/1993 | Yasaki et al. |
| 5,620,672 A | 4/1997 | Galligan et al. |

FOREIGN PATENT DOCUMENTS

| DE | 19534434 C1 | 3/1997 |
| WO | WO 92/02302 | 2/1992 |
| WO | WO 92/09848 | 6/1992 |

*Primary Examiner*—John Sheehan
*Assistant Examiner*—Andrew L. Oltmans
(74) *Attorney, Agent, or Firm*—William J. Zak, Jr., Esq.

(57) ABSTRACT

A method of coating a catalyst layer on a metallic substrate includes preparing a metal oxide and binder slurry to coat onto a metal surface and forming a catalytic layer over the slurry coated surface. The slurry may be made from a binder containing, for example, fully dissolved alumina in the presence of excess nitric acid. The binder may then be mixed with a metal oxide mixture to form the metal oxide-binder slurry. The metal oxide mixture may contain aluminum oxide or partially hydrated aluminum oxide. The metal oxide-binder slurry can be used to coat the surfaces of a variety of metals such as aluminum, titanium, nickel, cobalt, chromium, iron, copper, etc., or their alloys that include brass, as well as stainless steel with or without Al as a component.

31 Claims, 1 Drawing Sheet

METHOD OF PREPARING A CATALYST LAYER OVER A METALLIC SURFACE OF A RECUPERATOR

CROSS REFERENCE TO RELATED APPLICATIONS

This application is a continuation-in-part of U.S. application Ser. No. 09/659,629, filed Sep. 12, 2000.

BACKGROUND OF THE INVENTION

The present invention generally relates to catalytic layers and, more particularly, to a method of preparing a catalytic layer on a metallic surface, such as the inside of a recuperator.

Using a metallic substrate to support a catalytic coating continues to become more important. Due to its high thermal conductivity and good ductility, metals have been found to be a preferred choice of catalyst substrates in applications where robust heat transfer, complicated flow path, and lightweight are critically important. One such application is a metallic catalytic heat exchanger (such as a recuperator) where a part of or the whole heat-transfer area can be functionalized with catalytic properties by applying a catalyst layer over the metal substrate. To prepare a catalyst coating over a variety of metal substrates with a simple, generalized method, however, represents major technical challenges.

Generally, the catalyst layer typically consists of a small fraction of an active metal ingredient supported by a refractory metal oxide with high surface area. A traditional method of preparing the metal oxide layer as the catalyst support has been to make a refractory metal oxide slurry with water and acid, and then washcoating the resulting mixture directly over a ceramic substrate such as a cordierite monolith. An example of this approach is the acid stabilized alumina sol method. This method generally cannot be used directly for a metal surface because of weak coating binding strength that results in spalling and peeling of the coated catalyst layer.

Currently, there are a few methods of coating a metal substrate with a high surface area refractory metal oxide before applying the catalytic metal ingredients. However, these methods usually have significant limitations and are applicable to only one or a few metal-type surfaces. One such method is to coat an alumina slurry to the surface of a stainless steel containing aluminum (Al) as a key component (e.g. Fecralloy and Kanthal, etc.). The surface, however, needs to be pretreated with high temperature air so that a layer of alumina or alumina whiskers can be formed before the catalyst coating.

Another past method includes forming an underlayer with a refractory metal oxide slurry before coating an overlayer of catalyst. The underlayer consists of mixture of alumina with silica sol in order to improve the binding strength of the catalyst overlayer coating.

A further past method provides an underlayer by coating a mixture comprising a dispersion of aluminum metal powder in an aqueous solution of a chromium salt and aluminum phosphate, followed by curing at elevated temperatures.

Some disadvantages, however, to the above methods include the fact that using an aluminum-containing alloy substrate significantly limits the choice of metal substrate for application of the catalyst. Also, the types of stainless steel substrates having such alloys are generally expensive. Additionally, forming alumina whiskers or an oxide layer adds cost and time associated with the process. The use of chromium salt, a known carcinogen, generates an environmental hazard. Phosphate is known to deactivate catalyst function by migrating from the underlayer and reacting with catalytic metal under elevated temperatures.

For certain applications, the substrate metal may be something other than stainless steel, such as titanium. Yet, needing to use a silica sol mixture as an underlayer not only increases the number of catalyzing process steps but can also result in undesirable catalytic effects known as silica poisoning, which can deactivate the catalyst under elevated reaction temperature. Furthermore, the binding strength of the undercoat layer containing silica can be significantly weakened under high temperature and high humidity due to hydrolytic scission of silicon-oxygen bond, resulting in spalling and peeling of the coating.

It is, therefore, highly desirable to have a catalytic coating method for metal substrates which eliminates the above limitations.

SUMMARY OF THE INVENTION

Accordingly, in one aspect of the present invention, a method of catalytically coating a metal surface comprises coating the metal surface with a slurry containing a binder; forming an oxide coating on the metal surface; and applying a solution of catalytic material onto the oxide coating.

These and other features, aspects and advantages of the present invention will become better understood with reference to the following drawings, description and claims.

DETAILED DESCRIPTION OF THE INVENTION

Figure 1:
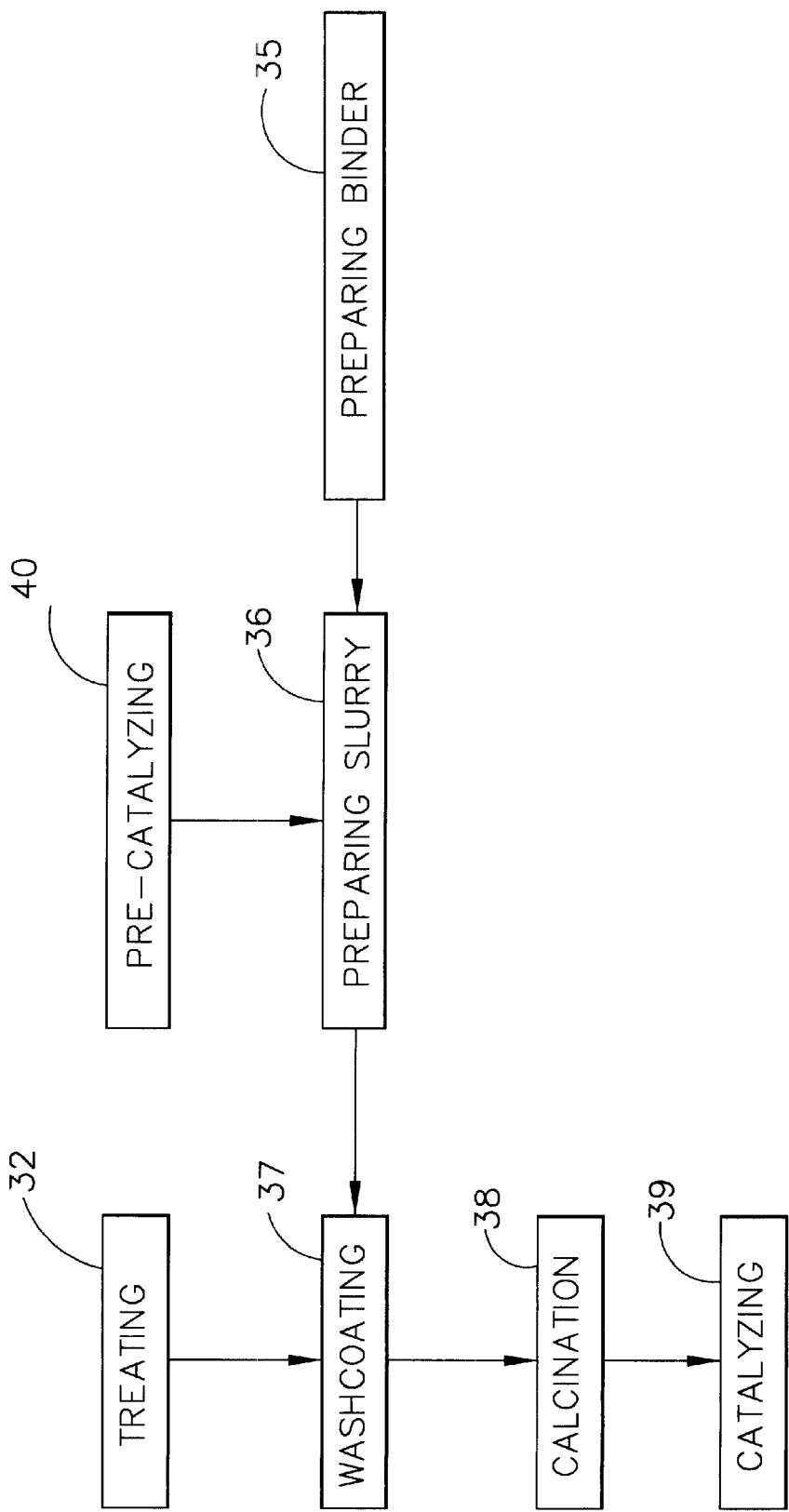
FIG. 1 is a flowchart depicting a method of coating a catalyst on a metal surface according to an embodiment of the present invention.

In general, the method of the present invention includes preparing a metal oxide and binder slurry to coat onto a metal surface and forming a catalytic layer over the metal substrate. The slurry may be made from a binder containing, for example, fully dissolved alumina in the presence of excess nitric acid. The binder may then be mixed with a metal oxide mixture to form the metal oxide-binder slurry. The metal oxide mixture may contain aluminum oxide or partially hydrated aluminum oxide.

The metal oxide-binder slurry of the present invention can be used to coat the surfaces of a variety of metals such as aluminum, titanium, nickel, cobalt, chromium, iron, copper, etc., or their alloys that include brass, as well as stainless steel with or without Al as a component. Thus, the present method can be applied to non-ferritic metals such as titanium or brass. Single or multiple coatings of the metal oxide-binder slurry can be implemented depending on the coating thickness required. Accordingly, a single coating may be the entire catalyst layer. For multiple coatings, one or more slurry coating(s) may be used as a support layer(s) to a catalyst coating. The metal oxide-binder slurry coating has excellent binding with a metallic substrate while maintaining a porous structure and high surface area for catalytic reaction.

In contrast with the conventional alumina sol method where the coating is thin (i.e., about 5 $\mu$m to 15 $\mu$m) and binding strength decreases rapidly (i.e., about 0 B to 1 B according to American Society for Testing Material method D-3359) with an increase of coating thickness, the present invention provides a thicker coat (i.e., about 10 to 30 μm) with significantly improved coating mechanical strength (i.e., about 3 B to 5 B). It can be used as the catalyst support containing only alumina with high purity. By using a previously catalyzed metal oxide in the slurry or using a metal oxide-binder slurry mixed with a catalytic precursor solution, the slurry coating can also form a catalytic layer directly over the metal substrate surface.

Furthermore, and in contrast to prior art methods, a binder is used in forming the slurry. This binder may be prepared by completely dissolving, for example, partially hydrated alumina or pseudoboehmite into nitric acid. The binder can then mixed with partially hydrated gamma alumina or non-hydrated gamma alumina to form the metal oxide-binder slurry. Such slurry will provide improved coating properties such as enhanced thickness and higher mechanical strength in contrast with the prior art, as shown in the below Examples. Also in contrast to the prior art, the present invention omits the use of known carcinogens that generate environmental hazards when being used. The present invention also omits the use of compounds known to deactivate catalyst function, for example, by migrating from an underlayer and reacting with catalytic metal at elevated temperatures. The present invention further omits the use of compounds that become unstable due to hydrolytic decomposition in high humidity at elevated temperatures, which is a common catalytic reaction condition.

More specifically, and in accordance with one embodiment of the present invention of FIG. 1, the method involves a metal substrate surface treating step 32, a binder preparing step 35, a pre-catalyzing step 40, a slurry preparing step 36, a coating step 37, a forming or calcining step 38, and a catalyzing step 39. The treating step 32 includes pretreating the metal substrate surface, cleaning the substrate surface, and improving the hydrophilicity of the substrate surface. Desirably, residual oil and dust on the metal substrate surface should first be removed by a general cleaning method such as general washing with hot water and detergent. Following the general washing and the metal substrate may then be dried, such as by flowing dry air over the surface. Next, the metal substrate may be additionally washed with concentrated nitric acid ranging from about 1 to 15N at room temperature to further remove rust and/or unevenly distributed oxide layer that may form as a result of atmospheric oxidation and corrosion. The additional acid washing with concentrated nitric acid may also serve to passivate the metal surface by forming a thin, dense oxide layer through nitric oxidation.

The actual wash time and acid concentration for the acid washing depends on the metal used for the substrate. For example, a high acid concentration (e.g., about 5 to 15 N) and long wash time (e.g., about 10 to 30 minutes) is preferred for titanium and stainless steel while a low concentration (e.g., about 1 to 5 N) and a short wash time (e.g., about 5 to 20 minutes) is more suitable for aluminum and brass surfaces.

After the acid washing, the metal substrate may be subjected to heating in flowing air at a temperature from about 200 to 600° C. for about 30 to 120 minutes. A very thin (i.e., less than sub-micron in thickness) metal oxide layer is thereby formed on the substrate surface as the result of the oxidation by air. Since the metal composition is generally quite consistent throughout the substrate, the type of metal oxide layer formed through the chemical reaction of surface metal with oxygen is therefore also uniform in composition and evenly distributed over the substrate surface. Such oxidation layer makes the substrate surface more hydrophilic and easier to be wetted by the water based slurry in the following steps than before such heat treatment.

In the binder-preparing step 35, a binder is prepared and eventually serves as an agent to bind together a metal substrate surface with aluminum oxide particles as well as between alumina particles in the coating. The binder may be made by fully dissolving a high surface area, refractory metal oxide powder in acid, for example, aluminum oxide powder in nitric acid. The aluminum oxide powder used for this invention can be gamma alumina or a mixture of gamma alumina and alumina hydroxide commonly known as Boehmite. Not intending to be limited by the following theory, the binder made in such fashion contains dimeric and polymeric aqua ions linked through Al—O—Al bridge bonds such as $[Al(H_2O)_4OH]_2^{4+}$. These types of ions may react further with metal oxide particles during the slurry making step 36 and calcination step 38 described below, and form a metal oxide bond network which leads to the improvement of the coating binding strength.

Notwithstanding the foregoing, other metal oxides or metal hydroxides can be used and selected based on their ability to be dissolve in acidic or basic solution to form polymeric moieties. Accordingly, metal oxides and metal hydroxides such as Boehmite, porous silica, and hydrous titanium oxide can be dissolved in a basic solution such as sodium hydroxide to form dimeric or polymeric species such as $[(HO)_3AlOAl(OH)_3]^{2-}$, $(Si_2O_7)^{6-}$, etc. Likewise, other useful bases include ammonium hydroxide, sodium hydroxide, sodium carbonate, etc. Furthermore, the binder can be made by dissolving and mixing metal nitrate salts in diluted nitric acid. Such metal nitrate compounds include aluminum nitrate nonahydrate, titanium nitrate tetrahydrate and zirconyl nitrate hydrate, etc. Yet, in another embodiment of the invention, the binders can be made by mixing and agitating water (or diluted nitric acid) with the metal alkoxide solution to form dimeric or polymeric oxo species. Such metal alkoxides include aluminum tributoxide, titanium isopropoxide, zirconium butoxide, etc.

During the binder-preparing step 35, and in accordance with one preferred embodiment, concentrated nitric acid (15N) may be gradually added to deionized water in a reaction vessel while the resulting acid solution is agitated continuously. The weight percent of the concentrated nitric acid can preferably range from about 8 to 32% and, more preferably, about 16 to 24% of the final mixture weight including the aluminum oxide powder. The deionized water can preferably range from 60% to 90% and, more preferably about 70 to 80%.

After the acid solution from the foregoing is totally mixed, aluminum oxide powder may be gradually added while the resulting metal-acid mixture is vigorously agitated. The weight percent of the aluminum oxide in the final mixture ranges preferably from about 2 to 8% and, more preferably, about 4 to 6%. In this embodiment, the weight percent of aluminum oxide ranges from about 4 to 6%. The weight percent of concentrated nitric acid ranges from about 16 to 24%, balanced by deionized water in the final mixture.

Following complete mixing of the acid solution, the temperature of the reactor is raised from ambient to the range of about 60 to 120° C. In this preferred embodiment, the reaction temperature ranges from about 80 to 100° C. The mixture is continuously agitated and refluxed at the reaction temperature from about 4 to 10 hours until all the aluminum oxide powder is dissolved and the mixture becomes completely translucent. Unlike an alumina sol used in the known art that will gel in a few days, the binder of the present invention can be stored for multiple years without changing its physical and chemical properties.

In the slurry-preparing step 36, the slurry is prepared by mixing the binder from step 35 with a refractory metal oxide, such as gamma alumina powder or pseudoboehmite powder. This mixing is followed by agitation at ambient temperature until the refractory metal oxide powder is completely suspended in the resulting slurry mixture. The weight percent of the binder in the slurry mixture ranges from about 10 to 30% and, more preferably about 15 to 25%. The weight percent of the refractory metal oxide in the mixture ranges from 10 to 30% and, more preferably, about 15 to 25%. The remaining portion is balanced by deionized water. In a preferred embodiment, the weight percent of the binder in the slurry mixture ranges from about 15 to 25% and the weight percent of the refractory metal oxide in the mixture ranges from about 15 to 25%, balanced by deionized water. Notwithstanding the foregoing, various refractory metal oxides can be used and selected based on their ability to be suspended in the slurry after thorough agitation and capability to form $M_1$—O—$M_2$ bonds in the final coating where $M_1$ represents the metal of the metal oxide and $M_2$ represents the metal in the binder solution, respectively. Accordingly, other refractory metal oxides such as Boehmite, porous silica, titania, zirconia, ceria, etc. can be employed.

During the slurry-preparing step 36, the duration of agitation mentioned above should be sufficient to suspend the metal oxide powder in the slurry without precipitation and ranges from about 2 to 10 hours. The agitation can be completed in a batch reactor with a standard agitator known to the art, such as a propeller agitator. Alternatively, the mixing and agitation can be accomplished by a ball-mill or a jet-mill also known to the art. After agitation, the pH of the final slurry ranges from about 2.5 to 4.5 and, more preferably, about 3.0 to 4.0. The density of the final slurry ranges from about 1.05 to 1.3 gram/cm$^3$ and, more preferably, about 1.1 to 1.2 gram/cm$^3$. The viscosity of the final slurry ranges from about 5 to 35 centipose and, more preferably, about 5 to 15 centipose.

The resulting metal oxide-binder slurry produced from step 36 provides a thicker coating with increased adhesion to the metal substrate when compared to that of a conventional alumina sol approach, as will be further described below and in the Examples. In particular, the binder in the slurry provides flexibility in that the slurry may be catalyzed or non-catalyzed as described below. Additional advantages achieved by the use of the binder in the slurry include simplicity in the preparation method without the need of complicated equipment with high capital cost. For example, the agitation can be completed in a low-cost, propeller agitator in a batch reactor in comparison with high cost ball-mill machine, which is used in the conventional slurry making process. This is particularly useful for large quantity industrial production.

As mentioned above, and in another embodiment of the invention, a catalyst precursor in the form of a metal salt solution can be added to the metal oxide-binder slurry mixture during the slurry-preparing step 36. An advantage of this approach is that the catalyzing step 39 can be omitted after the coating 37 and calcining 38 steps described below. This omission is due to the catalyst precursor(s) being able to convert to catalysts in the final coating product on the metal substrate.

The catalyst precursors can be those of precious metals and/or transition metal salts that do not contain chlorine. The precursor salts used in this embodiment are generally chlorine free to avoid corrosion between the coated layer and metal substrate. The choice of catalyst precursor(s) depends on the application. For example, for catalytic oxidation of carbon monoxide and hydrocarbons, the precious metals can be platinum, palladium, ruthenium, rhodium, iridium, gold, etc. The transition metals can be copper, manganese, nickel, iron, cobalt, chromium, cerium, etc. The precursors are typically in the form of a nitrate, acetate, sulfate or sulfite. Thus, examples of catalyst precursors include platinum sulfite, palladium nitrate, copper acetate, nickel nitrate, manganese nitrate, etc. The relative weight percent of the catalyst precursor in reference to the amount of refractory metal oxide used in the slurry ranges from about 0.1% to 30% and, more preferably about 0.5 to 10%. In the preferred embodiment, it ranges from about 0.5% to 7% for precious metal precursors and about 0.2 to 20% for transition metal precursors. When one or more precious metal precursors are combined with one or more transition metal precursors, a preferred atomic ratio of transition metal to precious metal is about 0.1 to 100 and, more preferably about 0.5 to 20.

In yet another embodiment of this invention, the refractory metal oxide powder can be treated in a pre-catalyzing step 40 before the slurry preparation step 36. During the pre-catalyzing step 40, the metal oxide powder is first pre-catalyzed with the catalyst precursor through a wet-incipient or impregnation method followed by a pre-calcination step known to the art to form a powdered catalyst. The fine metal oxide powder, such as gamma alumina with particle size less than about 100 mesh, is first mixed with the catalyst precursor solution such as chloroplatinic acid through a titration and an agitation process. The mixture is then dried slowly in flowing air while being agitated continually. Upon drying, the catalyzed powder mixture will be pre-calcined at an elevated temperature, typically from 800° F. to 1100° F. in the presence of air or hydrogen to convert the catalyst precursor into catalyst. After the pre-calcination, the mixture, which tends to aggregate in the form of a cake, will be further broken down to the fine powder with a typical particle size of less than about 100 mesh through grinding followed by a sieving process. The catalyst powder thus formed contains precious metal or transition metal oxide crystallites dispersed throughout the refractory metal oxide support. The catalyst metals (i.e., precious metals and/or transition metals) may be in a zero valance state or in an oxidative state. The pre-catalyzed refractory metal oxide powder can then be mixed with the binder and deionized water to form the slurry mixture.

An advantage of the foregoing embodiment is that catalyst metal precursors containing chlorine can be used. This is important since some of the Cl containing precursors are known to be preferred for the preparation of a catalyst with high metal dispersion and utilization efficiency. An example is chloro-platinic acid which is an excellent catalyst precursor for preparing supported Pt catalyst. Chlorine containing catalyst precursors cannot be used in the above mentioned prior art approaches because Cl will result in corrosion between the metal substrate and coating during the calcination stage. However, by pre-catalyzing the metal oxide in the step 40 before the slurry preparation 36 and coating 37, the chlorine will be removed in the form of Cl$_2$ or HCl gas during the pre-calcining through thermal decomposition of the dried precursor before it can be mixed in the slurry-preparing step 36. Another advantage of this approach is that the catalyzing step 39 can be omitted after the coating 37 and calcining 38 steps.

A further embodiment of this invention includes the slurry being made by mixing the binder with a refractory metal oxide mixture that includes aluminum oxide as one of its components. An example of a refractory metal oxide mixture is Hopcalite (which is a mixture of manganese dioxide, cupric oxide and aluminum oxide). Acidified Hopcalite slurry prepared by a conventional method known in the art is difficult to coat over the metal surface and the resulting coating is often thin and easy to spall. However, after mixing and agitation of the binder and fine grain Hopcalite following the procedures described above for the present invention, the resulting slurry can be coated easily on the metal substrate after the coating step 37 described below. The slurry coating formed after the coating 37 and calcining 38 steps has an advantageous thickness with excellent adhesion to the metal substrate. Furthermore, the catalytic activity remains the same as that of the powder or pelletized Hopcalite catalyst.

Following the slurry-preparing step 36 of the first embodiment mentioned above, the slurry can be coated over the metal substrate in the coating step 37, with the coating methods being those commonly known in the art. For example, the metal substrate can be coated by dipping it into the slurry, followed by blowing with air to remove excess slurry from the surface. For a metal substrate with a complicated shape, such as the internal surface of a recuperator, it is preferred that a partial vacuum be generated in the coating slurry tank before the internal surface of the recuperator is filled by the slurry so that there is no void space and no un-coated area. To prevent uneven distribution of the coating, it is also preferred that the metal substrate be rotated slowly with differing orientations during the drying process. Other suitable coating methods include spraying, painting, brushing, etc.

After the coating step 37, the metal substrate with a coated layer of slurry can be dried, such as by flowing a constant stream of dry air. Thereafter, the calcining step 38 at an elevated temperature in flowing air occurs. The calcination temperature ranges from about 400 to 700° C. and, more preferably about 500 to 600° C. One preferred temperature range is about 500 to 560° C. The calcination process 38 can last from about 1 to 8 hours and, more preferably about 2 to 4 hours.

The calcining step 38 converts partially hydrolyzed metal oxides and metal nitrates into metal oxides with a different oxide crystal structure through thermal decomposition, dehydrolysis and phase transition processes. The metal oxide formed after calcination is mechanically and chemically more stable and cannot be re-dissolved into water. As an example, aluminum oxide, aluminum nitrate, aluminum hydroxide and pseudoboehmite after the coating with aluminum oxide-binder slurry can be all converted into stronger and more stable gamma alumina by eliminating water and nitrate groups through thermal dehydrolysis and nitrate decomposition. This can result in hardening of the slurry coating with enhanced mechanical strength through the formation of Al—O—Al bond within and in between the oxide particles in the coating by linking the individual Al—OH group through dehydrolysis. Meanwhile, a chemical bond (such as M—O—Al, wherein M is the metal type of the substrate) may also form at the interface of the slurry coating and the metal substrate and which improves the adhesion of the slurry coating to the substrate.

The coated layer after calcination consists of high surface area, chemically stable metal oxides or metal oxide mixtures in the presence of an acid or base media. The improvement of the chemical inertness of the coating is the result of transforming chemically active metal hydroxide into much less active metal oxide. Furthermore, the thermal decomposition will convert the water-soluble metal nitrate to metal oxide which is generally insoluble in water. The morphologic parameters, such as surface area, porosity, etc., of such prepared coated metal oxides have the similar characteristics to that in a powder form. One such example is gamma alumina. Another example is the mixture of titania and gamma alumina mixture. For example, the surface area of such prepared gamma alumina may range from about 150 to 300 $M^2$/gram and, more preferably, about 180 to 250 $M^2$/gram. Its layer thickness preferably ranges from 5 to 50 microns for a single layer and, more preferably, about 10 to 30 microns.

After the calcination step 38, the coated substrate can be either catalyzed in the next step 39 or be re-coated with the same or a different slurry via the coating step 37. The two or multiple coat approach can be used to increase the overall thickness of the coating in order to increase the catalyst loading and/or create a catalyst distribution as the function of the depth of coating in the next step 39. Both catalyst loading and catalyst distribution are important parameters to determine the catalyst operation lifetime. Alternatively, the first applied coating(s) can be used as an underlayer and coated with another type of metal oxide or catalyst slurry that cannot be coated directly onto the metal surface.

The catalyzing process 39 following the calcining step 38 is generally needed if the slurry used in the coating step 37 does not contain a catalyst precursor or pre-catalyzed metal oxide, as described above. The catalyzing process 39 can be accomplished through a metal impregnation process that is known in the field. For example, the coated metal substrate can be immersed into a solution containing the catalyst metal precursor. The catalyst precursors should be those of precious metal or transition metal salts that do not contain chlorine. As noted above, examples of such catalyst metal precursors include platinum sulfite, palladium nitrate, nickel nitrate, manganese nitrate, copper acetate, etc. After the coating is completely wetted by the precursor solution, the excess liquid can be removed such as by draining followed by blowing with air-knife. The coating impregnated with the catalyst precursor can be dried, such as by flowing with a stream of dry air.

After drying, the precursor impregnated coating can be calcined to convert the dried metal salt, which is distributed throughout the coating, into an active catalyst component such as dispersed metal oxide particles or fine metallic crystallites, depending on the calcination condition and the chemical nature of the precursors. The calcination process is generally conducted at elevated temperature of about 800° F. to 1100° F. in the presence of air. The catalytic salts (such as metal nitrate or sulfite) under the high temperature will be decomposed into metal oxides while releasing nitrogen oxides and sulfur oxides. Alternatively, the catalytic salt in the coating can be calcined in a chemically reducing environment at elevated temperature. For example, the catalytic coating can be heated in a hydrogen stream diluted by nitrogen gas. Under such condition, the catalyst salt will be reduced to its zero-valence, metallic state while releasing nitrogen and hydrogen sulfide into the gas stream. The treatment temperature in either air or diluted hydrogen depends on the specific type of metal salt used as the catalyst precursor. Preferably, the coated metal substrate may be heated in the temperature range of about 500° F. to 1200° F. for about 30 to 300 minutes.

EXAMPLES

Example 1

A washcoat binder solution was prepared by mixing 4 wt. % of pseudoboehmite (UOP Versal 250) with 16 wt. % concentrated nitric acid (15 N) and 80% deionized water. The mixture was heated to 80° C. in a reflux reactor while being vigorously agitated for 8 hours. The boehmite powder was completely dissolved at the end of the process and the mixture was transformed from milky white to a yellowish, translucent solution.

Example 2

A washcoat slurry was prepared by mixing 23 wt. % of the binder prepared according to Example 1, 23 wt. % of pseudoboehmite (UOP Versal 250) and 54 wt. % of deionized water. The mixture was agitated vigorously in a batch reactor at ambient temperature for 8 hours. The physical measurement of the slurry yielded a density of 1.15 gram/cm$^3$, a pH of 3.75, and a viscosity of 13.7 centipose.

Example 3

A stainless steel plate (type 316) was dip-coated with the slurry prepared according to Example 2. Before the coating, the plate was washed by concentrated nitric acid and deionized water, followed by drying and heating at 500° C. for one hour. After dip-coating, the plate was dried at ambient temperature, followed by calcination in dry air at 550° C. for two hours. A layer of gamma alumina was formed on the surface of the plate which was designated as Sample A.

A comparative sample was made by coating an identical stainless steel plate with the conventional alumina sol slurry. The alumina sol slurry was prepared by thoroughly blending 30% of gamma alumina oxide, 2.1% nitric acid and 67.9% of deionized water, followed by ball-milling for three hours. The stainless steel plate, after acid washing and pretreating as that for Sample A, was dipped into the alumina sol slurry followed by drying and calcination in dry air at 550° C. for two hours. A layer of gamma alumina was formed on the surface and this plate was designated as Sample B.

The average coating layer thicknesses for both Sample A and Sample B were measured by a micrometer with an accuracy of ±1 micrometer. The strength of coating adhesion of aluminum oxide on both plates for Samples A and B was measured by a peel test according to American Society for Testing Material (ASTM) method D-3359. In this test, zero means no adhesion and 5 B indicates no peeling under the test condition. The measurement results of both thickness and coating strength are listed in Table I. As demonstrated in Table I, the aluminum oxide coating prepared by the present invention provides higher thickness and substantially stronger adhesion strength, in comparison with the coating prepared by the conventional alumina sol method.

TABLE 1

| | Coating Thickness ($\mu$m) | Peel Strength |
|---|---|---|
| Sample A | 19 | 4B |
| Sample B | 12 | 0B |

Example 4

A titanium plate was dip-coated with the slurry prepared according to Example 2. Before the coating, the plate was washed by concentrated nitric acid and deionized water, followed by drying and heating at 500° C. for one hour. After dip-coating, the plate was dried at ambient temperature, followed by calcination in dry air at 550° C. for two hours. A thin layer of gamma alumina with a 15 $\mu$m thickness was formed over the plate surface. A peel test according to ASTM method D-3359 yielded a coating strength of 5 B for the alumina layer over the titanium plate.

Example 5

A brass plate (35% Zn and 65% Cu) was dip-coated with the slurry prepared according to Example 2. Before the coating, the plate was washed by concentrated nitric acid and deionized water, followed by drying and heating at 110° C. for one hour. After dip-coating, the plate was dried at ambient temperature, followed by calcination in dry air at 550° C. for two hours. A thin layer of gamma alumina with a thickness of 20 $\mu$m was formed over the plate surface. A peel test according to ASTM method D-3359 yielded a coating strength of 3 B for the alumina layer over the brass plate.

Example 6

A metallic monolith was made by rolling a corrugated aluminum sheet with an off-set fin stamping pattern. The monolith was first washed in an industrial detergent solution to remove the oil and dust on the surface, followed by drying in a convection oven at 120° C. for 1 hour. The monolith was then dip-coated in the slurry prepared according to the Example 2, followed by air-knifing to remove the excess slurry, drying, and calcination at 530° C. for two hours. The coating process was repeated once more and the final amount of aluminum oxide in the monolith was about 1.0 gram/in$^3$. A nitrogen BET measurement was conducted to characterize the aluminum oxide on the surface of aluminum monolith. The measurement yielded a specific surface area of the washcoated aluminum oxide of 260 M$^2$/gram with an average pore diameter of 7.5 Å.

Example 7

A stainless steel (type 316) sheet with a stamped offset fin configuration was first washed in concentrated nitric acid, followed by drying and calcination at 500° C. for one hour. The sheet was then dip-coated in the slurry prepared according to the Example 2, followed by air-knifing to remove the excess slurry, drying, and calcination at 530° C. for two hours. The coated sheet was further washcoated in a slurry mixture containing cerium nitrate, titania and deionized water, followed by drying and calcination. After two layers of coating with different slurry, the sheet was catalyzed with Pt through impregnation by platinum sulfite. A portion of the catalyzed sheet was inserted in a plug-flow type of reactor and its catalytic oxidation activities towards diethyl sulfide and triethyl amine were evaluated. The catalytic light-off temperatures and conversions were similar or better than the same catalyst supported on a ceramic monolith.

Example 8

A heat-exchanging device was made with stainless steel and consisted of a hot side and a cold side. The hot side contacted directly with the emission from the upstream natural gas combustion which contained carbon monoxide, steam, and un-combusted air. The metal surface on the hot side was first washed by nitric acid (3N), followed by rinsing with deionized water and drying. The hot side surface was then dip-coated in the slurry prepared according to the Example 2 under vacuum, followed by air-knifing to remove the excess slurry, drying, and calcination at 530° C. for four hours. After aluminum oxide formed on the metal surface, it was further catalyzed with platinum sulfite with an impregnation approach. During the operation of the heat-exchanging device, the catalyzed metal surface on the hot side catalyzed the oxidation of CO and >99% of the carbon monoxide in the emission stream was converted to $CO_2$ after the heat-exchanging process.

It should be understood, of course, that the foregoing relates to preferred embodiments of the invention and that modifications may be made without departing from the spirit and scope of the invention as set forth in the following claims.

We claim:

1. A method of catalytically coating a metal surface, comprising:
   dissolving a powder of a member selected from the group consisting of metal oxides, metal hydroxides, metal nitrate salts and metal alkoxides so that the member is in a solution to obtain a metal coating binder composition;
   mixing a refractory metal oxide into said binder composition to obtain a binder slurry composition;
   coating said metal surface with said binder slurry composition to thereby form a first slurry coating on said metal surface;
   forming an oxide coating on said metal surface; and
   applying a solution of catalytic material onto said oxide coating.

2. The method of claim 1, wherein said metal surface is selected from the group consisting of aluminum, titanium, nickel, cobalt, chromium, iron, copper, brass, stainless steel with aluminum, and stainless steel without aluminum.

3. The method of claim 1, further comprising cleaning said metal surface prior to the step of coating said metal surface.

4. The method of claim 3, wherein cleaning said metal surface comprises washing said metal surface in acid.

5. The method of claim 1, wherein forming said oxide coating comprises heating said metal surface.

6. The method of claim 1, wherein forming said oxide coating comprises calcining said first slurry coating.

7. The method of claim 1, further comprising chemically bonding said first slurry coating to said metal surface.

8. The method of claim 1, further comprising coating said first slurry coating with a second slurry coating.

9. The method of claim 8, wherein said first and second slurry coatings are of the same composition.

10. The method of claim 8, wherein said first and second slurry coatings are of different compositions.

11. The method of claim 1, wherein the powder member is heated in the presence an acid or a base to dissolve the powder.

12. The method of claim 11, wherein said refractory metal oxide is mixed into said binder composition so that said refractory metal oxide is suspended in the binder composition to obtain the slurry.

13. The method of claim 1, wherein said powder is a metal oxide selected from the group consisting of pseudoboehmite, alumina, porous silica, titania, zirconia, and ceria.

14. The method of claim 1, wherein said powder comprises a mixture of metal oxides in which at least one of the metal oxides is selected from the group consisting of pseudoboehmite, alumina, porous silica, titania, and zirconia.

15. The method of claim 1, wherein said powder comprises a combination of metal oxides or of metal hydroxides or of metal oxides and metal hydroxides.

16. The method of claim 15, wherein said powder is selected from the group consisting of pseudoboehmite, porous silica, titania, and hydrous titanium oxide.

17. A method of catalytically coating a metal surface, comprising:
   preparing a first slurry containing a binder by mixing a first metal oxide with said binder, said binder comprising a second metal oxide or metal hydroxide and one of an acid and a base, and wherein said acid is selected from the group consisting of nitric acid and sulfuric acid and said base is selected from the group consisting of ammonium hydroxide, sodium hydroxide, sodium carbonate, and potassium hydroxide;
   coating said metal surface with said first slurry to thereby form a first slurry coating;
   forming an oxide coating on said metal surface; and
   applying a solution of catalytic material onto said oxide coating.

18. A method of catalytically coating a metal surface, comprising:
   preparing a first slurry containing a binder by mixing a first metal oxide with said binder, said binder comprising a metal alkoxide and an acid;
   coating said metal surface with said first slurry to thereby form a first slurry coating;
   forming an oxide coating on said metal surface; and
   applying a solution of catalytic material onto said oxide coating.

19. The method of claim 18, wherein said metal alkoxide is selected from the group consisting of aluminum alkoxide, titanium alkoxide, and zirconium alkoxide.

20. The method of claim 18, wherein said acid is nitric acid.

21. A method of catalytically coating a metal surface, comprising:
   preparing a first slurry containing a binder by mixing a first metal oxide with said binder, said binder comprising a metal nitrate salt dissolved in an acid;
   coating said metal surface with said first slurry to thereby form a first slurry coating;
   forming an oxide coating on said metal surface; and
   applying a solution of catalytic material onto said oxide coating.

22. The method of claim 21, wherein said metal nitrate salt is selected from the group consisting of aluminum nitrate nonahydrate, titanium nitrate tetrahydrate, and zirconyl nitrate hydrate.

23. The method of claim 21, wherein said acid is nitric acid.

24. A method of catalytically coating a metal surface, comprising:
   dissolving a powder of a member selected from the group consisting of metal oxides, metal hydroxides, metal alkoxides and metal nitrate salts so that the member is in a solution to obtain a metal coating binder composition;
   precatalyzing a refractory metal oxide with a metal catalyst precursor material to obtain a precatalyzed metal oxide composition;
   mixing said precatalyzed metal oxide composition into said binder composition to obtain a binder slurry composition;
   coating said metal surface with said binder slurry composition to thereby form a slurry coating on said metal surface; and
   forming an oxide and catalyst coating on said metal surface.

25. The method of claim 24, wherein said catalyst precursor is selected from the group consisting of transition metals and combinations thereof.

26. The method of claim 24 wherein said pre-catalyzing comprises a pre-calcination step.

27. The method of claim 1, wherein coating said metal surface comprises painting said metal surface with said binder slurry composition.

28. The method of claim 1, wherein coating said metal surface comprises spraying said binder slurry composition over said metal surface.

29. The method of claim 1, wherein coating said metal surface comprises submerging said metal surface in said binder slurry composition.

30. A method of catalytically coating a metal surface, comprising:

dissolving a metal oxide composition in nitric acid, wherein said metal oxide composition is selected from a group consisting of pseudoboemite, alumina, titania, and zirconia, to obtain a translucent metal coating binder solution without particle suspension;

mixing a refractory metal oxide into said binder solution, wherein the refractory metal oxide is selected from a group consisting of pseudoboehmite, alumina, porous silica, titania, and zirconia to obtain a binder slurry composition;

coating said metal surface with said binder slurry composition to thereby form a slurry coating on said metal surface;

forming an oxide coating on said metal surface; and applying a solution of catalytic material onto said oxide coating.

31. A method of catalytically coating a metal surface, comprising:

preparing a first slurry containing a binder by mixing a first metal oxide with said binder, said binder comprising a fully dissolved second metal oxide or metal hydroxide in one of an acid and a base, and wherein said acid is selected from the group consisting of nitric acid and sulfuric acid and said base is selected from the group consisting of ammonium hydroxide, sodium hydroxide, sodium carbonate, and potassium hydroxide;

coating said metal surface with said first slurry to thereby form a first slurry coating;

forming an oxide coating on said metal surface; and applying a solution of catalytic material onto said oxide coating.

* * * * *